United States Patent [19]

Matsumoto et al.

[11] Patent Number: 4,851,503
[45] Date of Patent: Jul. 25, 1989

[54] WHOLLY AROMATIC THERMOTROPIC LIQUID CRYSTAL POLYESTER

[75] Inventors: Mitsuo Matsumoto, Kurashiki; Teruhisa Kaneda, Osaka, both of Japan

[73] Assignee: Kuraray Company, Ltd., Kurashiki, Japan

[21] Appl. No.: 134,980

[22] Filed: Dec. 18, 1987

[30] Foreign Application Priority Data

Dec. 29, 1986 [JP] Japan ................. 61-310918

[51] Int. Cl.$^4$ ............................. C08G 63/02
[52] U.S. Cl. ................... 528/176; 528/193; 528/194; 528/195; 528/219; 528/271; 264/176.1; 252/299.64
[58] Field of Search ............... 528/193, 194, 195, 176, 528/219, 271; 264/176.1; 252/299.64

[56] References Cited

U.S. PATENT DOCUMENTS

| | | | |
|---|---|---|---|
| 3,637,595 | 5/1969 | Cottis et al. | 528/193 |
| 3,644,593 | 5/1969 | Nowak et al. | 525/151 |
| 3,975,487 | 8/1976 | Cottis et al. | 264/210.6 |
| 4,349,659 | 9/1982 | Kato et al. | 528/193 |
| 4,603,190 | 7/1986 | Dicke et al. | 528/193 |
| 4,626,557 | 12/1986 | Duska et al. | 523/100 |
| 4,639,504 | 1/1987 | Cottis | 528/176 |
| 4,741,955 | 5/1988 | Saito et al. | 428/325 |

FOREIGN PATENT DOCUMENTS 0237358 10/1987 European Pat. Off. .

Primary Examiner—Maurice J. Welsh
Assistant Examiner—S. A. Acquah
Attorney, Agent, or Firm—Oblon, Spivak, McClelland, Maier & Neustadt

[57] ABSTRACT

A novel wholly aromatic thermotropic liquid crystal polyester consisting essentially of 4-oxybenzoyl unit, terephthaloyl unit, 4,4'-dioxydiphenyl unit and 4,4'-dioxydiphenyl ether unit has a relatively low transition temperature to liquid crystal as well as good flow characteristics, and has thereby good melt-formability. The polyester gives melt extruded fibers and melt extruded films having superior mechanical strengths and elastic moduli, and also gives injection-molded products having superior strengths, excellent thermal characteristics, elastic moduli and impact strengths.

16 Claims, No Drawings

WHOLLY AROMATIC THERMOTROPIC LIQUID CRYSTAL POLYESTER

BACKGROUND OF THE INVENTION

This invention relates to a wholly aromatic polyester having excellent formability for giving various formed products having excellent mechanical properties and thermal properties.

Demands for higher performances of organic polymeric materials have been increasing in the industry, and strongly desired are various formed products such as fiber, film, injection molded product, etc. having superior mechanical properties such as strength and elastic modulus and thermal properties such as heat resistance.

As a polymeric material meeting the above demands, a polyester which forms an optically anisotropic melt phase, that is, so-called thermotropic liquid crystal polyester has drawn attention, and have so far been proposed thermotropic liquid crystal polyesters of various structures, of which several have been industrially produced.

Such polymers can form a product having a highly oriented molecular structure upon melt processing. Such product has been found to exhibit an excellent mechanical properties. Further it is well known that various formed products obtained from wholly aromatic thermotropic liquid crystal polyester consisting only of aromatic rings have markedly good thermal resistance.

As described above, wholly aromatic thermotropic liquid crystal polyester is excellent as a high performance material, and particularly a wholly aromatic thermotropic liquid crystal polyester derived from p-hydroxybenzoic acid, terephthalic acid and 4,4'-dihydroxydiphenyl has been under a commercial name of Xydar industrially produced. However, since the wholly aromatic thermotropic polyester derived from p-hydroxybenzoic acid, terephthalic acid and 4,4'-dihydroxydiphenyl has a markedly high temperature of transition to liquid crystal phase, that is, melting point of more than 400° C., the meld forming process requires a high temperature of more than 400° C., thus making it difficult to form with a conventional molding machine, requiring a special forming machine.

For the purpose of lowering the melting point to facilitate the melt processing, a method which comprises copolymerizing a small amount of 2-hydroxy-6-naththoic acid ( U.S. Pat. Nos. 4,473,682 and 4,522,974 ) has been proposed.

SUMMARY OF THE INVENTION

According to this invention, is provided a novel wholly aromatic polyester consisting essentially of recurring units from the following I , II , III and IV :

I.

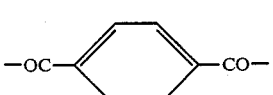

II.

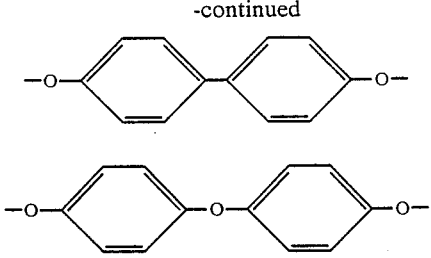

wherein the unit I is contained in the range from 30 to 80 mol%, the unit II is contained in the range from 10 to 35 mol%, the unit III is contained in the range from 2.5 to 25 mol%, the unit IV is contained in the range from 5 to 30 mol%, and the total mols of the unit III and unit IV is substantially the same as that of the unit II ; having an inherent viscosity, when determined in pentafluorophenol solution at a concentration of 0.1 wt./vol% and at 60° C., of 0.5 dl/g or higher; and being capable of forming an optically anisotropic melt phase.

The wholly aromatic thermotropic liquid crystal polyester provided by the present invention has, compared with wholly aromatic polyester derived from p-hydroxybenzoic acid, terephthalic acid and 4,4'-dihydroxydiphenyl, a lower temperature of transition to liquid crystal phase and a better flow characteristics, and so is excellent in melt processability; and formed products obtained from the polyester have excellent mechanical properties, particularly excellent toughness and shock resistance as compared to conventional ones, and also have excellent thermal characteristics.

DETAILED DESCRIPTION OF THE INVENTION

Among the recurring structural units consisting the wholly aromatic polyester of this invention, the unit I is 4-oxybenzoyl moiety and can be derived from 4-hydroxybenzoic acid or the functional derivatives thereof. The unit I is contained in the polyester in an amount of 30 to 80 mol%, preferably 40 to 70 mol%.

The unit II is terephthaloyl moiety and can be derived from terephthalic acid or the functional derivatives thereof. The unit II is contained in the polyester in an amount of 10 to 35 mol%, preferably 15 to 30 mol%.

The unit III is 4,4'-dioxydiphenyl moiety and can be derived from 4,4'-dihydroxydiphenyl or the functional derivatives thereof. The unit III is contained in the polyester in an amount of 2.5 to 25 mol%, preferably 3 to 20 mol%.

The unit IV is 4,4'-dioxydiphenyl ether moiety and can be derived from 4,4'-dihydroxydiphenyl ether or the functional derivatives thereof.

The unit IV is contained in the polyester in an amount of 5 to 30 mol%, preferably 7 to 25 mol%. The presence of the unit IV in the above amount makes the melting point of obtained polymer markedly lower and increases flow characteristics compared with the one containing no unit IV, whereby the processability increases remarkably and toughness and resistance to shock of formed products obtained from the polyester increase.

While the polyester can be formed at a relatively lower temperature, the formed products have excellent thermal characteristics such as high retention ratio of mechanical properties at high temperatures, high heat deflection temperature, good soldering characteristics and markedly small weight loss at high temperatures.

When the unit IV exists in an amount lower than 5 mol%, the transition temperature to liquid crystal phase, i.e. melting point of the obtained polyester is not notably decreased compared with that having no unit IV, and therefore the polyester does not have a sufficient processability and formed products obtained therefrom are poor in toughness. On the other hand when the unit IV exists in an amount more than 30 mol%, even if a polyester showing optically anisotropic melt phase be obtained, formed products obtained from such polyester are, having low strengths and elastic moduli, not preferred. Further when the unit IV exists in an amount far above 30 mol%, thermotropic liquid crystal polyester is not formed.

It is necessary that molar amount of the unit II is substantially the same as the sum of molar amounts of the unit III and unit IV.

A part of hydrogen atoms present upon each aromatic ring of the above units I, II, III and IV may be substituted with an alkyl group having 1 to 4 carbon atoms, an alkoxy group having 1 to 4 carbon atoms, halogen, a phenyl group and the like. However usually it is preferred that the substituting groups be not present because obtained polyester has a higher crystallinity and also because formed products obtained from the polyester have higher mechanical properties.

The polyester according to the present invention consists of recurring units from the above units I to IV of the above construction, and preferably forms at a temperature of preferably lower than 375° C., more preferably lower than 350° C. an optically anisotropic melt phase, and also preferably has an inherent viscosity of more than 0.5 dl/g determined in pentafluorophenol solution at a concentration of 0.1 wt./vol.% at 60° C. The confirmation of the formation of an optically anisotropic melt phase can, as well known by those skilled in the art, be done by observing a thin strip of specimen, preferably one of 5 to 20 μm interposed between cover glasses, with a polarizing microscope equipped with a heating stage, under crossed polarizers, to watch the transmission of light at a certain temperature and above. Here by this observation, at high temperatures either applying a light pressure onto the specimen interposed between the cover glasses or applying shear force to the cover glasses will give a surer observation of polarized light. In this observation a temperature at which polarized light starts transmitting is the temperature of transition to an optically anisotropic melt phase. Also this transition temperature can be determined by the positions of endotherms when thermal behavior of a specimen is observed with a differential scanning calorimeter (DSC) at a constant temperature increasing rate, usually at a rate of 10° to 20° C./min. Since the endotherms observed in the phase transition from crystal to liquid crystal are much weaker than those of crystal melting to isotropic phase of conventional crystalline polymers, much attention should be paid to the observation. Sometimes more than one endotherms are observed, whereby a temperature giving the major peak can be deemed the transition temperature. Also, an annealing procedure on the specimen under a suitable condition sometimes make clearer the endotherms.

When the transition temperature obtained by observation with a polarized microscope is not identical with that by DSC measurement, the higher temperature is deemed the temperature of transition to an anisotropic melt phase in this invention.

When the transition temperature is above 375° C., the polymerization is not effected readily, the obtained polymer is inferior in melt processability, and formed products obtained from the polymer are inferior in mechanical properties.

The polyester according to this invention should, as described before, have an inherent viscosity of more than 0.5 dl/g. In the case where the inherent viscosity is lower than 0.5 dl/g, formed products obtained from the polymer do not have sufficient mechanical properties. The inherent viscosity of the polyester of this invention is more than 0.5 dl/g, preferably in the range from 1 to 10 dl/g, more preferably in the range from 1.25 to 7.5 dl/g.

It has been known that the copolymerization of 4,4'-dihydroxydiphenyl ether is effective in lowering the melting point of thermotropic liquid crystal polyester. For example W. J. Jackson Jr. describes in The British Polymer Journal, December, 1980, page 154, that bisphenols represented by the formula:

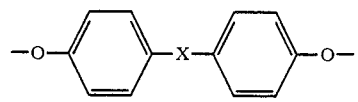

wherein $X=(CH_3)_2C$, S and O, have an effect of lowering the melting point of polyester. However the paper at the same time describes that the addition of the above bisphenols decreases tensile and flexural properties of the resulting moldings. Further J. I. Jin et al report in the same journal, December, 1980, page 132 that the copolymerization of bisphenols represented by the formula:

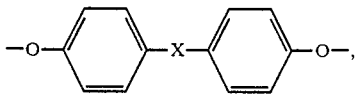

wherein $X=(CH_3)_2C$, $SO_2$, $CH_2$, S and O, decreases the melting point of a polyester consisting of chlorhydroquinone and terephthalic acid. Still further Japanese Patent Publication No. 482/1980 illustrates a fiber obtained from a thermotropic liquid crystal polyester consisting of a substituted hydroquinone such as chlorhydroquinone and methylhydroquinone, 4,4'-dihydroxydiphenyl ether and terephthalic acid.

U.S. Pat. No. 3,637,595 claims the heat-resistant polyester obtained from

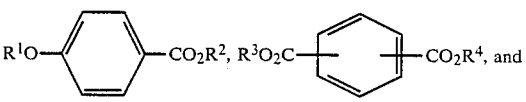

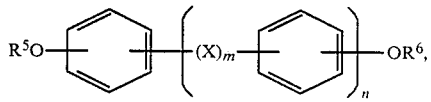

wherein X denotes —O— or —$SO_2$—m denotes 0 or 1, and n denotes 0 or 1. However, in that patent there is disclosed that in the case where terephthalic acid having linear orientation characteristics is employed as aromatic dicarboxylic acid, the softening point or the melting point of the resulting polyester is markedly high; and the patent does not disclose or even suggest that in the case where as aromatic dioxy compounds a combination of a 4,4'-dioxydiphenyl derivative and a 4,4'-dioxydiphenyl ether derivative in a certain ratio, a polyester formable into a thermotropic liquid crystal at a relatively low temperature can be obtained and the polyester has an improved tractability and can give a superior formed product being excellent in mechanical properties and thermal characteristics.

From the above references or from any other published reference it can not even be imagined that a polyester consisting of 4-oxybenzoyl units, terephthaloyl units, 4,4'-dioxydiphenyl unit and 4,4'-dioxydiphenyl ether units in certain ratios be excellent in melt processability, and that formed products obtained from the polyester be excellent in all of mechanical properties including strength, modulus, impact resistance, etc., and various thermal characteristic.

Further as is clear from later described Comparative Examples, for the wholly aromatic thermotropic liquid crystal polyester according to this invention consisting of 4-oxybenzoyl unit, terephthaloyl unit, 4,4'-dioxydiphenyl unit and 4,4'-dioxydiphenyl ether unit, in the case where instead of 4,4'-dioxydiphenyl ether unit

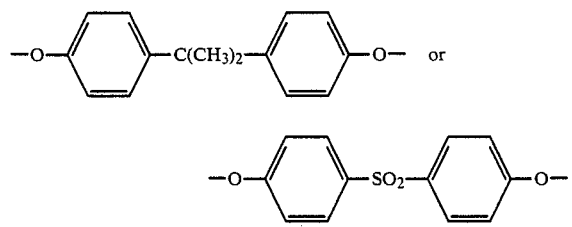

is employed, there can not be obtained a polyester being meltpolymerizable and melt formable at temperatures below 400° C.

Another feature of the present invention exists in that in the polyester according to this invention, by changing contents of the unit III and the unit IV, mechanical properties of various formed products obtained from the polyester can be changed to a great extent. Taking injection-moldings as an example, as the ratio of 4,4'-dioxydiphenyl ether moiety increases, and the ratio of 4,4'-dioxydiphenyl moiety decreases, the strength and the modulus decreases and the impact resistance increases. On the contrary, as the ratio of 4,4'-dioxydiphenyl moiety increases, the strength and the modulus increases while the impact resistance decreases.

In the case of fiber or film, as the ratio of 4,4'-dioxydiphenyl moiety increases, the strength and the modulus increase; and as the ratio of 4,4'-dioxydiphenyl ether moiety increases, though the strength and the modulus decrease, the breaking elongation and toughness increase. Further it is still another feature of the present invention that in the formed products obtained from the polyester of this invention, there is a tendency of being suppressed surface fibrillation which has been one of the drawbacks of formed products obtained from thermotropic liquid crystal polyesters proposed so far.

The polyester of this invention can be prepared by various condensation reactions, and is usually prepared by melt polymerization. Normally while charging starting materials which give the unit I, the unit III and the unit IV, of which hydroxyl groups have been converted to lower acyl esters, polymerization is conducted by so-called acidolysis method. Acetate is the most preferred as the lower acyl ester.

Though the polymerization may be carried out without employing a catalyst, it is often the case that employment of known catalyst in an amount of about 0.001 to 1 wt.%, preferably about 0.005 to 0.5 wt.% to total monomer weight may give a preferred result from the viewpoint of polymerization rate. Mentions are made of examples of the catalysts such as alkaline metal or alkali earth metal salts of carboxylic acids, alkyl tin oxides, diaryl tin oxides, alkyl stannic acids, titanium dioxide, alcoxy titanium silicates, titanium alkoxides, Lewis acid, hydrogen halides, etc. Melt polymerization is usually carried out at a temperature of 200 to 400° C. under atmosphere of an inert gas such as nitrogen or argon, preferably in a stream thereof or under a reduced pressure.

As the polymerization proceeds, the reaction temperature is increased and also the degree of pressure reduction adjusted. The polymerization time is normally in the range from 1 to 10 hours. After completion of the melt polymerization, the resultant polymer may optionally be minutely crashed and the polymerization may further be continued at a temperature below the melting point in a solid phase to increase polymerization degree.

By the method described above, a polyester consisting of the moieties in the same molar ratios as those of charged raw material compounds is obtained.

The polyester of this invention can readily be formed, by melt processing at a temperature above the temperature of transition to an optically anisotropic melt phase measured by the afore-described method, usually at a temperature 5 to 100° C. above the transition temperature, by a conventional method into formed products such as fiber, film and injection molded product. The thus obtained formed products have, as they are, markedly high tensile and flexural strengths, tensile and flexural moduli, and in the case of injection molded product further markedly high impact strength.

Optionally in the case of the above various formed products, particularly of fiber and film, by conducting heat treatment at a temperature below the temperature causing sticking of the fibers or the films with each other while removing off generated byproducts, the mechanical properties can still be enhanced. The period of the heat treatment is selected from the range from 1 minute to about 50 hours.

Various fillers and/or reinforcing agent may be incorporated to the wholly aromatic polyester of this invention to increase properties of the obtained formed products. For example addition of glass fiber or carbon fiber, etc. can enhance mechanical properties and thermal characteristics of the products, particularly injection molded product, formed from the polyester. The amount of fillers and/or reinforcing agent is about 10 to 600 weight parts per 100 weight parts of the polyester of this invention.

The adoption of a particulate inorganic material as a filler is especially suitable to a sealing agent for various electronics parts. The amount of the particulate inorganic material used is preferably in the range from about 50 to 600 weight parts, more preferably 100 to 400 weight parts per 100 weight parts of the wholly aromatic polyester. Examples of the particulate inorganic materials are silica, talc, alumina, etc., among which silica, particularly so-called fused silica which has been melted at a high temperature and converted from crystalline to amorphous state, is preferred because of its high purity and low coefficient of linear expansion. For the particulate inorganic materials, it is preferred that the average particle size be about 1 to about 50 μm, and the average aspect ratio be below 2 : 1 so that, after the process of forming, anisotropy in the coefficients of linear expansion of the formed products caused by orientation of the inorganic material will not generate. Fused silica satisfying the above requirements have been industrially produced and used already normally for a sealing agent with epoxy resin.

The wholly aromatic polyester of this invention is incorporated with fillers and/or reinforcing agents at a temperature range where the wholly aromatic polyester melts, with a mixing kneader, a monoaxial extruder or a biaxial extruder by a known melt blending technique. The blending operation is carried out at a temperature higher than, preferably 5° to 50° C. higher than, the temperature of the transition of the wholly aromatic polyester from crystalline to liquid crystal phase for about 1 minute to about 30 minutes. Care is taken to have the filler substantially uniformly distribute in the wholly aromatic polyester.

The wholly aromatic polyester of this invention and the compositions of the polyester with various fillers and/or reinforcing agents can be used for fiber, film and various formed products such as heat-resistant containers, printed circuit boards, sealing agents for various electronics parts, connecters for various electronics parts, parts for automobiles, etc.

The present invention will be elucidated hereinbelow more concretely referring to Examples.

EXAMPLES

Example 1

Into a separable flask of 1-liter capacity equipped with a stirrer, a gas inlet, a distillation head and a condenser, 226.8 g (1.26 moles) of 4-acetoxybenzoic acid, 69.72 g (0.42 mole) of terephthalic acid, 56.7 g (0.21 mole) of 4,4'-diacetoxydiphenyl, 60.06 g (0.21 mole) of 4,4'-diacetoxydiphenyl ether and 0.1 g of sodium acetate as catalyst were charged. Then the flask was thoroughly purged of oxygen by evacuation and refilling with dry nitrogen three times, and thereafter dipped in a bath kept at 250° C. while passing dry nitrogen gas stream at a rate of about 3 l/hour.

After the content of the flask began melting and became a slurry, stirring was started and the content kept at the above temperature for 60 minutes. Then the bath temperature was raised to 280° C. over a period of about 10 minutes, and kept at the temperature for 60 minutes. Further the bath temperature was raised to 320° C. and kept at the temperature for 60 minutes. Up to this time 110 ml of acetic acid had been distilled off. Next, the inside of the flask was gradually evacuated to 20 mmHg over a period of 10 minutes. Thereafter the bath temperature was raised to 340° C., and the polymerization was continued while the inside pressure was kept at 0.4 mmHg. After 50 minutes, stirring was ceased and nitrogen gas was introduced to make the inside atmospheric pressure, followed by cooling of the flask. The content of the flask was taken out before it solidified completely. The yield of the obtained polymer was 243 g. After pulverizing the polymer, drying in vacuo was done at 130° C. for 10 hours. The thus obtained polymer showed an inherent viscosity of 4.65 dl/g when determined in pentafluorophenol solution at a concentration of 0.1 wt./vol.% at 60° C. The inherent viscosity $\eta_{inh}$ is calculated by the following equation:

$$\eta_{inh} = \frac{l_n t/t_0}{C}$$

wherein, $t_0$: dropping time of solvent, pentafluorophenol, measured at 60° C. in Uberohde viscometer t: dropping time of solution having dissolved the specimen C: concentration ( g/dl ) of the specimen solution.

When observation was made with a polarized microscope under crossed polarizers while raising the temperature of a thin strip of this polymer at a rate of 10° C./min. in a heating stage ( TH-600, Linkam Company ) in nitrogen gas atmosphere, the specimen started transmitting light at 293° C. and the amount of light passage became still greater at about 305° C., proving that the polymer formed an optically anisotropic melt phase. Also measurement with DSC ( Metler TH3000 ) at a temperature raising rate of 20° C./min. gave an endotherm at 296° C.

The polymer was subjected to a measurement by 500 MHz $^1$H-NMR ( JEOL GX-500 ) in a mixed solution of pentafluorophenol-trifluoroacetic acid, and it was confirmed that the polymer had the same construction as that of charged raw materials within limits of analysis accuracy.

The obtained polymer was molded, with an injection molding machine ( TK14-1AP, Tabata Machinery ), at a cylinder temperature of 325° C., under an injection pressure of 800 kg/cm$^2$ and at a mold temperature of 100° C., into test specimens of 75×15×2 mm. The thus obtained specimens were subjected to measurements for flexural strength and flexural modulus according to ASTM D790, and measurement for notched Izod impact strength according ASTM D256 to give the following results. ( all in the machine direction )

Flexural strength: 1480 kg/cm$^2$

Flexural modulus: 13.4×10$^4$ kg/cm$^2$

Notched Izod impact strength: 53 kgcm/cm

Further the specimen were measured for the mechanical properties at 100° C. and at 200°C., to show the retention ratios of flexural strength and modulus those measured at room temperature of 47.6 % and 53.1 % respectively at 100° C. and 20.3 % and 30.0 % respectively at 200° C.

The polymerization was repeated by the same method as above to give about 3 kg in total of the polyester. This was then injection molded with an injection molding machine ( SS80 S12ASE, Nissei Resin Industries ), at a barrel temperature of 320° C., mold temperature of 100° C. and under an injection pressure of 780 kg/cm$^2$, to give test specimens each of 126×12×3 mm, 126×12×6 mm, and 80×80×3 mm. The specimens of 126×12×6 mm were tested for heat deflection temperature according to ASTM D648, and those of 126×12×3 mm were tested for Vicat softening point according to ASTM D1525. The results are shown below.

Heat deflection temperature ( 18.6 kg/cm$^2$) : 250° C.

Vicat softening point : 265° C.

The specimens of 80×80×3 mm were tested for soldering characteristics to show no change in appearance after being dipped in a solder bath of 300° C. for 15 seconds.

The obtained polymer was extruded through a spinneret with one hole having a diameter of 0.2 mm and a land length of 1.0 mm kept at a temperature of 330° C., at an extrusion rate of 0.275 g/min. into a filament having a fineness of 6.8 denier. The thus obtained filament was heat treated in dry nitrogen gas stream successively at 230° C. for 1 hour, at 260° C. for 1 hour, and at 290° C. for 6 hours under relaxed condition. The mechanical properties of the filament as spun and after the heat treatment were as follows:

|  | As spun | After heat treatment |
|---|---|---|
| Elongation at break (%) | 1.85 | 4.10 |
| Tensile strength (g/denier) | 7.24 | 18.2 |
| Initial modulus (g/denier) | 536 | 530 |

Further, to 60 weight parts of the above polyester, 30 weight parts of glass fiber ( CS-3J-94/SP, made by Nittobo Company ) was added, and the mixture was kneaded with Plastgraph ( Brabender Company ) at 320° C. for 5 minutes, followed by injection molding in a manner similar to that described before. The mechanical properties in the machine direction of the thus obtained molded product were as follows:
Flexural strength: 1978 kg/cm$^2$
Flexural modulus: 15.8×10$^4$ kg/cm$^2$
Notched Izod impact strength: 14.8 kgcm/cm

Example 2

Polymerization was conducted in a manner similar to that described in Example 1, by charging 4-acetoxybenzoic acid, terephthalic acid, 4,4'-diacetoxydiphenyl and 4,4'-diacetoxydiphenyl ether in molar ratios of 60/20/5/15. The obtained polymer showed an inherent viscosity of 3.55 dl/g. Observation with a polarized microscope and measurement with DSC proved that the polymer formed an optically anisotropic melt phase at and above a temperature of 280° C.

The obtained polymer was injection molded in the same manner as in Example 1, and the obtained test specimens were tested for mechanical properties to give results as below.
Flexural strength: 1300 kg/cm$^2$
Flexural modulus: 6.7—10$^4$ kg/cm$^2$
Notched Izod impact strength: 80 kgcm/cm The polymer was also extruded through a film forming machine equipped with a T-die having a slit width of 100 mm and a slit gauge of 0.1 mm, at a cylinder temperature of 320° C. at an extrusion rate of 15 g/min. to give film of 40 μm thick steadily. Test specimens were prepared from the thus obtained film and subjected to a tensile test at an extension rate of 10 %/min. to give the following results:
Tensile strength: 28.5 kg/mm$^2$
Tensile modulus: 1010 kg/mm$^2$
Elongation at break: 3.5%

Example 3

Polymerization was conducted in a manner similar to that described in Example 1, by charging 4-acetoxybenzoic acid, terephthalic acid, 4,4'-diacetoxydiphenyl and 4,4'-diacetoxydiphenyl ether in molar ratios of 55/22.5/12.5/10. The obtained polymer showed an inherent viscosity of 3.92 dl/g and formed an optically anisotropic melt phase at and above a temperature of 300° C.

The polymer was injection molded in the same manner as in Example 1, and the obtained test specimens were tested for mechanical properties to give the following results:
Flexural strength: 1520 kg/cm$^2$
Flexural modulus: 14.8×10$^4$ kg/cm$^2$
Notched Izod impact strength: 42 kgcm/cm The polymer was also spun in a manner similar to that described in Example 1 into a filament having the following properties:
Fineness (denier): 8.4
Tensile strength (g/denier): 7.11
Elongation at break (%): 1.7
Initial modulus (g/denier): 564

Example 4

Polymerization was conducted in a manner similar to that described in Example 1, by charging 4-acetoxybenzoic acid, terephthalic acid, 4,4'-diacetoxydiphenyl and 4,4'-diacetoxydiphenyl ether in molar ratios of 45/27.5/5/22.5. The obtained polymer showed an inherent viscosity of 4.01 dl/g and formed an optically anisotropic melt phase at and above a temperature of 299° C.

The polymer was injection molded in the same manner as in Example 1, and the obtained test specimens were tested for mechanical properties to give the following results:
Flexural strength: 1190 kg/cm$^2$
Flexural modulus: 5.6×10$^4$ kg/cm$^2$
Notched Izod impact strength: 88 kgcm/cm

Example 5

Example 2 was repeated except for that sodium acetate as catalyst was not used and that the polymerization time at 340° C. and 4.0 mmHg was 5 minutes. The obtained polymer showed an inherent viscosity of 1.94 dl/g and formed an optically anisotropic melt phase at and above a temperature of 280° C.

Using the mixing kneader used in Example 1, 250 weight parts of fused silica ( GR-80, average particle diameter: 20μm, made by Toshiba Ceramics ) was melt-blended with 100 weight parts of the above obtained wholly aromatic polyester. The fused silica had been surface treated in a conventional manner with 1 weight % of a coating agent of γ-glycidoxypropyltrimethoxysilane ( SH-6040 made by Toray Silicone ).

Test specimens were prepared by injection molding from the thus obtained blend of the wholly aromatic polyester and the fused silica, and tested for coefficient of linear expansion in the machine direction at 30° to 230° C. to give a coefficient of about $-2\times10^{-5}$cm/cm/°C.

The test specimen showed no change appearance after being dipped in a solder bath of 300° C. for 30 seconds.

This specimen contained less than 50 ppm of water-extractable alkaline metals and less than 100 ppm of water-extractable halogens.

Using the blend of the wholly aromatic polyester and the fused silica, sealing molding of a semiconductor device for test was done. Under conditions of barrel temperature of 330° C., mold temperature of 150° C. and cycle of molding of 10 seconds, a good device was formed. Neither displacement nor damages, etc. was observed on lead wire of the sealed product.

Comparative Example 1

Polymerization was conducted in a manner similar to that described in Example 1, by charging 4-acetoxybenzoic acid, terephthalic acid, 4,4'-diacetoxydiphenyl and 4,4'-diacetoxydiphenyl ether in molar ratios of 60/20/17.5/2.5. At the latter period of polymerization the viscosity in the system markedly increased; and particularly when the inside of the system started to be evacuated, the inside partly solidified to make impossible to carry out uniform stirring. The bath temperature was raised further to maintain at 400° C., the content would not melt so that uniform stirring could not be performed.

Measurement on the obtained polymer with DSC showed a sharp endotherm at 522° C.

As shown above, in the case where the content of 4,4'-dioxydiphenyl ether unit is as low as 2.5%, a uniform polymer can not be obtained by melt polymerization, and a polyester forming an optically anisotropic melt phase at temperatures below 375° C. can not be obtained either.

Comparative Example 2

In a manner similar to that described in Example 1, there were charged 4-acetoxybenzoic acid, terephthalic acid, 4,4'-diacetoxydiphenyl and 4,4'-diacetoxydiphenyl ether in molar ratios of 20/40/30/10. Polymerization was started in the same manner as in Example 1. When a period of time was elasped after having raised the bath temperature to 320° C., the viscosity in the system increased remarkably. When the temperature was raised up to 340° C. and the evacuation started, the content solidified to render stirring impossible. When the bath temperature was raised even to 400° C., the content did not melt. The obtained product was powder form and was not capable of melt molding.

Comparative Example 3

In a manner similar to that described in Example 1, there were charged 4-acetoxybenzoic acid, terephthalic acid, 4,4'-diacetoxydiphenyl and 4,4'-diacetoxydiphenyl ether in molar ratios of 20/40/5/35. Polymeriztion was started in the same manner as in Example 1. After a period of time after the bath temperature had been raised to 320° C., the viscosity inside the system increased remarkably; and when the bath temperature was raised to 340° C. and then to 380° C., the content did not melt at all to become powdery state to make impossible further polymerization.

Comparative Examples 4 and 5

Example 1 was repeated except for that instead of 4,4'-diacetoxydiphenyl ether, 2,2'-bis(4-acetoxyphenyl)-propane or bis(4-acetoxyphenyl)sulphone respectively each in the same molar amount as 4,4'-diacetoxydiphenyl ether. In either case a polyester forming an optically anisotropic melt phase was not obtained.

What we claim is:

1. A wholly aromatic polyester consisting essentially of recurring units from the following I, II, III and IV ( at least a part of hydrogen atoms bonded to the ring may be substituted with substituting groups ):

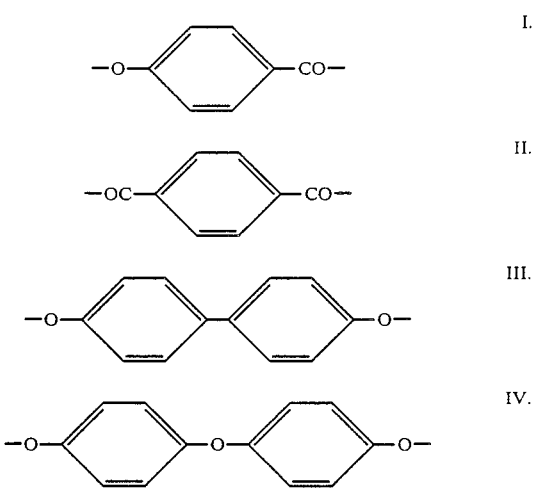

wherein the unit I is contained in the range from 30 to 80 mol%, the unit II is contained in the range from 10 to 35 mol%, the unit III is contained in the range from 2.5 to 25 mol%, the unit IV is contained in the range from 5 to 30 mol%, and the total mols of the unit III and unit IV is substantially the same as that of the unit II; said polyester having an inherent viscosity, when determined in pentafluorophenol solution at a concentration of 0.1 wt./vol% and at 60° C., of 0.5 dl/g or higher; and said polyester being capable of forming an optically anisotropic melt phase.

2. A wholly aromatic polyester as defined in claim 1, wherein the unit I is contained in the range from 40 to 70 mol%, the unit II is contained in the range from 15 to 30 mol%, the unit III is contained in the range from 3 to 20 mol%, the unit IV is contained in the range from 7 to 25 mol%, and the total mols of the unit III and unit IV is substantially the same as that of the unit II.

3. A wholly aromatic polyester as defined in claim 1, wherein aromatic rings contained in the recurring units from I, II, III and IV are not substituted.

4. A wholly aromatic polyester as defined in claim 1, wherein a part of hydrogen atoms bonded to each aromatic ring of the recurring unit I, II, III or IV have been substituted with an alkyl group having 1 to 4 carbon atoms, an alkoxy group having 1 to 4 carbon atoms, halogen or a phenyl group, etc.

5. A wholly aromatic polyester as defined in claim 1, wherein said polyester is capable of forming an optically anisotropic melt phase at and below a temperature of 375° C.

6. A wholly aromatic polyester as defined in claim 1, wherein said polyester is capable of forming an optically anisotropic melt phase at and below a temperature of 350° C.

7. A wholly aromatic polyester as defined in claim 1, wherein said polyester has an inherent viscosity of 1.0 to 10 dl/g when determined in pentafluorophenol solution at a concentration of 0.1 wt./vol.% at 60° C.

8. A wholly aromatic polyester as defined in claim 1, wherein said polyester has an inherent viscosity of 1.25 to 7.5 dl/g when determined in pentafluorophenol solution at a concentration of 0.1 wt./vol.% at 60° C.

9. A formed product comprising a wholly aromatic polyester according to claim 1.

10. A film prepared by melt-extruding a wholly aromatic polyester according to claim 1.

11. A fiber prepared by melt-extruding and spinning a wholly aromatic polyester according to claim 1.

12. A composition comprising 100 weight parts of the wholly aromatic polyester according to claim 1, and about 10 to 600 weight parts of a filler and/or a reinforcing agent.

13. A formed product comprising a composition according to claim 12.

14. A sealing agent for electronics parts comprising 100 weight parts of the wholly aromatic polyester according to claim 1 and about 50 to 600 weight parts of a particulate inorganic material.

15. A sealing agent for electronics parts as defined in claim 14, wherein said particulate inorganic material has an average aspect ratio of 2 : 1 and an average particle size is about 1 to 50 μm.

16. A sealing agent for electronics parts as defined in claim 14, wherein said particulate inorganic material is fused silica.

* * * * *